United States Patent [19]

Jasinski

[11] 3,844,796

[45] Oct. 29, 1974

[54] COLORED GLASS COMPOSITIONS

[75] Inventor: John Jasinski, Toledo, Ohio

[73] Assignee: Owens-Illinois, Inc., Toledo, Ohio

[22] Filed: Mar. 30, 1972

[21] Appl. No.: 239,725

Related U.S. Application Data

[63] Continuation of Ser. No. 883,317, Dec. 8, 1969, abandoned.

[52] U.S. Cl. .................... 106/52, 106/48, 252/300, 350/1
[51] Int. Cl. ........ C03c 3/24, C03c 3/04, G02b 5/20
[58] Field of Search .......... 883/317; 106/52, 54, 48; 252/300; 350/1

[56] References Cited
UNITED STATES PATENTS

| | | | |
|---|---|---|---|
| 1,411,134 | 3/1922 | Taylor | 106/53 |
| 3,173,850 | 3/1965 | Hood | 106/52 |
| 3,203,816 | 8/1965 | Bull | 106/54 |
| 3,351,475 | 11/1967 | Hagedorn | 106/52 |

OTHER PUBLICATIONS

Weyl, W. – Coloured Glasses; Sheffield, England, 1951, pp. 136–137 pp. 116–117; pg. 123 (QD 139 G5 W4)

Norton, F. H., Elements of Ceramics; Cambridge, Mass., 1952, (TP 807 N65) p. 199.

*Primary Examiner*—Helen M. McCarthy
*Attorney, Agent, or Firm*—Richard B. Dence; E. J. Holler

[57] ABSTRACT

Glass compositions containing the oxides $SiO_2$, $Al_2O_3$, $Na_2O$, $CaO$, $MgO$, $Fe_2O_3$, $K_2O$, $Mn_2O_3$, $CrO_3$ and $Cr_2O_3$, wherein the manganese is in its highest oxidation valence state and wherein the weight percent ratio of Cr to Mn, expressed as $Cr_2O_3$ to MnO, ranges from 0.05:0.1 to 0.1:0.1.

3 Claims, No Drawings

COLORED GLASS COMPOSITIONS

REFERENCE TO RELATED APPLICATION

This application is a continuation of my copending application Ser. No. 883,317, filed Dec. 8, 1969 and now abandoned, the entire disclosure of which is relied on.

BACKGROUND OF THE INVENTION

The present invention relates to certain new glass compositions. More particularly, the instant invention pertains to novel glasses of a variety of colors formed by intimately and homogeneously blending selected ingredients to produce colored glass compositions.

In the past, colored glasses were often hard to produce and economically impracticable because of utilization of costly glass-making ingredients and the difficulty of melting and forming the prior known glasses. Also, with prior known colored glasses, the colors were often faded in appearance or they lacked the distinct and desired shade and hue for successfully manufacturing articles of commerce.

Now, in accordance with the present invention, selected glass-forming ingredients are used to form glasses in a variety of colors, and which colors are stable and distinct. The glasses of this invention lend themselves successfully to the manufacture of a multiplicity of articles of commerce. Further, in accordance with the present invention, the selected glass-forming ingredients can be intimately and homogeneously blended together, melted and formed into articles using conventional glass-forming apparatus. Because of these above-recited unexpected advantages, the present invention provides colored glasses that are economically utilizable and practicable for many commercial endeavors.

Accordingly, it is a purpose of this invention to provide novel glass compositions that overcome the difficulties of the prior art.

Another purpose of this invention is to provide colored glasses made from inexpensive glass-forming ingredients.

Yet still another purpose of the present invention is to provide colored glasses that can be fabricated into items of commerce.

Still yet another purpose of the present invention is to provide glasses that can be melted, fined, formed and the like on conventional glass-forming equipment.

Other purposes and advantages will become apparent to persons skilled in the art from the following description of the invention.

SUMMARY OF THE INVENTION

This invention concerns novel colored glasses consisting essentially of:

| Component | Percent by Weight |
|---|---|
| $SiO_2$ | 68 to 74 |
| $Al_2O_3$ | 1 to 3 |
| $Fe_2O_3$ | 0.03 to 0.2 |
| CaO | 8 to 12 |
| MgO | 0.01 to 0.5 |
| $K_2O$ | 0.01 to 0.5 |
| $Na_2O$ | 12 to 16 |
| $Mn_2O_3$ | 0.05 to 0.5 |
| $Cr_2O_3$ | 0.05 to 0.3 |
| $CrO_3$ | 0.005 to 0.25 |

DESCRIPTION OF THE INVENTION

In accordance with the present invention, it has been found that it is possible to make novel colored glasses containing silicon dioxide ($SiO_2$), aluminum oxide ($Al_2O_3$), calcium oxide (CaO), magnesium oxide (MgO), sodium oxide ($Na_2O$), potassium oxide ($K_2O$); ferric oxide ($Fe_2O_3$), manganese oxide ($Mn_2O_3$); chromium oxide ($Cr_2O_3$) and ($CrO_3$) by introducing into the glass controlled amounts of the inexpensive and readily available materials $MnO_2$ and $K_2Cr_2O_7$ to produce the desired colored glass compositions.

In the colored glass compositions, the weight percentage of Cr to Mn, expressed as $Cr_2O_3$ to MnO, range from 0.05:0.1 to 0.1:0.1. The use of these ratios of $Cr_2O_3$ to MnO in the glass permits the powerful oxidizing agent hexavalent chrome to maintain another colorant, manganese, in the valence state wherein its coloring power is greatest.

Manganese exists in glasses in two possible states of oxidation; namely, manganese with a valence of plus six ($Mn^{+6}$) and manganese with a valence of plus two ($Mn^{+2}$). In the manganese plus two valence state ($Mn^{+2}$), it is a weak colorant giving a brownish color. In the manganese plus six valence state ($Mn^{+6}$), it is a powerful colorant giving a purple color. Normally, at low manganese concentrations, all the manganese is in the plus two state ($Mn^{+2}$), while in the presence of hexavalent chrome, all the manganese present is maintained in the plus six state ($Mn^{+6}$). Hexavalent chrome ($Cr^{+6}$) itself gives a yellow color in the glass.

Thus, this invention provides a proper adjustment of hexavalent chrome to manganese in accordance with the above weight percent ratio joined with the other glass-forming ingredients to produce colors ranging from light yellow through brownish green to chocolate and reddish brown. All these colors, in addition to being distinct, are ultraviolet absorbing colors. Glass melts were made according to the spirit of the invention wherein the hexavalent chrome levels ranged from 0.055 weight percent to 0.10 weight percent and the manganese oxide (MnO) levels extended from 0.10 weight percent to 0.15 weight percent. The colors produced ranged from greenish brown to reddish brown.

The following examples are typical of batches which can be used in the manufacture of colored glass compositions of the present invention. The conditions and procedures for making such molten base glasses are conventional and such conditions are well-known to those skilled in the art, as exemplified in Tooley's "Handbook of Glass Manufacturing," Ogden Publishing Company, New York 36, New York, 1953 on pages 242-252.

The following examples are illustrative of the present invention.

EXAMPLE 1

A novel glass of the invention was produced from the following materials:

| Materials | Weight in Grams |
|---|---|
| Ottawa sand | 135.49 |
| Soda ash | 47.13 |
| Lime | 37.72 |

-Continued

| Materials | Weight in Grams |
|---|---|
| Aplite | 14.42 |
| Niter | 1.35 |
| $K_2Cr_2O_7$ | 0.232 |
| Iron chromite | 0.183 |
| $MnO_2$ | 0.246 |

The materials were thoroughly blended and melted in a platinum crucible for 4½ hours at 2,650° F. The furnace was gas-fired and the atmosphere was about 1 to 3 percent oxygen. As will be apparent from the foregoing, an oxidizing atmosphere was maintained in the furnace. The glass was poured and its theoretical analysis is set forth in Example 2, immediately below.

EXAMPLE 2

| Component | Weight Percent |
|---|---|
| $SiO_2$ | 71.76 |
| $Al_2O_3$ | 1.95 |
| CaO | 10.51 |
| MgO | 0.21 |
| $Fe_2O_3$ | 0.085 |
| $Na_2O$ | 14.49 |
| $K_2O$ | 0.20 |
| $Mn_2O_3$ | 0.11 |
| $CrO_3$ | 0.078 |
| $Cr_2O_3$ | 0.041 |

The glass has a Cr, expressed as $Cr_2O_3$, to Mn, expressed as MnO, weight percent ratio of 0.1 to 0.1, and it had a chocolate-brown color. The glass composition was charged into a glass-forming mold for making a glass bottle by conventional glass-blowing techniques. As may be seen from the above example, the weight percent ratio of Cr to Mn, expressed as $Cr_2O_3$ to MnO, is obtained by converting the weight percent of $Mn_2O_3$ to MnO and converting the weight percent of $CrO_3$ to $Cr_2O_3$. The factor for converting weight percent of $Mn_2O_3$ to weight percent of MnO is 142/158 (twice the molecular weight of MnO divided by the molecular weight of $Mn_2O_3$). The factor for converting weight percent of $CrO_3$ to weight percent of $Cr_2O_3$ is 152/200 (the molecular weight of $Cr_2O_3$ divided by twice the molecular weight of $CrO_3$).

Illustratively:

0.11 ($Mn_2O_3$) × 142/158 = 0.1 (MnO)
0.078 ($CrO_3$) × 152/200 = 0.059 ($Cr_2O_3$)
Total $Cr_2O_3$ = 0.059 + 0.041 = 0.1
Ratio of total $Cr_2O_3$ to MnO = 0.1:0.1

EXAMPLE 3

The following materials were as in Example 1, employed to form a glass composition:

| Materials | Weight in Grams |
|---|---|
| Ottawa sand | 135.44 |
| Soda ash | 47.13 |
| Lime | 37.72 |
| Aplite | 14.42 |
| Niter | 1.35 |
| $K_2Cr_2O_7$ | 0.232 |
| Iron Chromite | 0.091 |
| $MnO_2$ | 0.246 |

This glass had a theoretical analysis as set forth in Example 4.

EXAMPLE 4

| Component | Weight Percent |
|---|---|
| $SiO_2$ | 71.8 |
| $Al_2O_3$ | 1.95 |
| CaO | 10.5 |
| MgO | 0.21 |
| $Fe_2O_3$ | 0.056 |
| $Na_2O$ | 14.46 |
| $K_2O$ | 0.20 |
| $Mn_2O_3$ | 0.11 |
| $CrO_3$ | 0.079 |
| $Cr_2O_3$ | 0.020 |

The glass had a Cr to Mn ratio, expressed as $Cr_2O_3$ to MnO, of 0.08 to 0.1, and the color of the glass was chocolate-brown. A gob of glass of the same composition as that above was charged into a parison mold and a conventional whiskey bottle was blown from the novel glass. It will be seen from the above example that the weight percent ratio of Cr to Mn, expressed as $Cr_2O_3$ to MnO, is obtained in the same manner as in Example 2.

It will be apparent from the foregoing examples that chocolate-brown glass compositions may be prepared within the following compositional ranges:

| Component | Weight Percent |
|---|---|
| $SiO_2$ | 71.76–71.8 |
| $Al_2O_3$ | 1.95 |
| CaO | 10.5 |
| MgO | 0.21 |
| $Fe_2O_3$ | 0.056–0.085 |
| $Na_2O$ | 14.46–14.49 |
| $K_2O$ | 0.20 |
| $Mn_2O_3$ | 0.11 |
| $CrO_3$ | 0.078–0.079 |
| $Cr_2O_3$ | 0.020–0.041 | and wherein the ratio of $Cr_2O_3$ to MnO is from 0.08:0.1 to 0.1:0.1.

The instant invention is also of use in making articles such as glass jars, bottles and other containers, pressed ash trays, drinking glasses and the like.

While the new preferred embodiments have been described above in detail, it will be understood that numerous modifications might be resorted to without departing from the scope of the invention as defined in the specification.

I claim:

1. A chocolate brown colored glass composition which absorbs ultraviolet light and which consists essentially of:

| Component | Weight Percent |
|---|---|
| $SiO_2$ | 71.76–71.8 |
| $Al_2O_3$ | 1.95 |
| CaO | 10.5 |
| MgO | 0.21 |
| $Fe_2O_3$ | 0.056–0.085 |
| $Na_2O$ | 14.46–14.49 |
| $K_2O$ | 0.20 |
| $Mn_2O_3$ | 0.11 |
| $CrO_3$ | 0.078–0.079 |
| $Cr_2O_3$ | 0.020–0.041 | wherein the ratio of $Cr_2O_3$ to MnO ranges from 0.08:0.1 to 0.1:0.1.

2. A colored glass composition as defined in claim 1 wherein the glass consists essentially of:

| Component | Weight Percent |
|---|---|
| $SiO_2$ | 71.76 |
| $Al_2O_3$ | 1.95 |
| CaO | 10.51 |
| MgO | 0.21 |
| $Fe_2O_3$ | 0.085 |
| $Na_2O$ | 14.49 |
| $K_2O$ | 0.20 |
| $Mn_2O_3$ | 0.11 |
| $CrO_3$ | 0.078 |
| $Cr_2O_3$ | 0.041 |

3. A colored glass composition as defined in claim 1 wherein the glass consists essentially of:

| Component | Weight Percent |
|---|---|
| $SiO_2$ | 71.8 |
| $Al_2O_3$ | 1.95 |
| CaO | 10.5 |
| MgO | 0.21 |
| $Fe_2O_3$ | 0.056 |
| $Na_2O$ | 14.46 |
| $K_2O$ | 0.20 |
| $Mn_2O_3$ | 0.11 |
| $CrO_3$ | 0.079 |
| $Cr_2O_3$ | 0.020 |

* * * * *